United States Patent
Scholz et al.

(10) Patent No.: US 9,953,761 B2
(45) Date of Patent: Apr. 24, 2018

(54) ARRANGEMENT AND METHOD FOR CONTACTLESS ENERGY TRANSMISSION WITH A COUPLING-MINIMIZED MATRIX OF PLANAR TRANSMISSION COILS

(75) Inventors: Peter-Dominik Scholz, Brakel (DE); Artjom Galliardt, Gau-Algesheim (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 524 days.

(21) Appl. No.: 14/115,467

(22) PCT Filed: May 3, 2012

(86) PCT No.: PCT/EP2012/058103
§ 371 (c)(1),
(2), (4) Date: Nov. 4, 2013

(87) PCT Pub. No.: WO2012/150293
PCT Pub. Date: Nov. 8, 2012

(65) Prior Publication Data
US 2014/0091640 A1 Apr. 3, 2014

(30) Foreign Application Priority Data
May 3, 2011 (DE) .................. 10 2011 100 368

(51) Int. Cl.
*H01F 38/14* (2006.01)
*H02J 50/10* (2016.01)
(Continued)

(52) U.S. Cl.
CPC ............ *H01F 38/14* (2013.01); *H02J 7/0042* (2013.01); *H02J 7/025* (2013.01); *H02J 50/10* (2016.02);
(Continued)

(58) Field of Classification Search
CPC ......... H01F 38/14; H02J 7/0042; H02J 7/025; H04B 5/0037; H04B 5/0081
(Continued)

(56) References Cited

U.S. PATENT DOCUMENTS 7,164,255 B2  1/2007  Hui
7,262,700 B2  8/2007  Hsu
(Continued)

FOREIGN PATENT DOCUMENTS

GB    2389720 A    12/2003
GB    2446305 A1    8/2008
(Continued)

OTHER PUBLICATIONS

Brice Rouzier, "Related International Patent Application No. PCT/EP2012/058103 International Search Report", dated Aug. 2, 2012, Publisher: PCT, Published in: EP.
(Continued)

*Primary Examiner* — Jared Fureman
*Assistant Examiner* — Emmanuel R Dominique
(74) *Attorney, Agent, or Firm* — Kaplan Breyer Schwarz, LLP

(57) ABSTRACT

The invention relates to an arrangement and a method for contactless energy transmission by means of induction. There are a plurality of coils arranged in a matrix, the coils having at least one conductor that surrounds a central axis of the coil at least once in one turn. The central axis stands vertically on the surface surrounded by the conductor in the geometric center of area of the surrounded surface. The coils are arranged adjacent to one another in a planar unit that extends in a first dimension, in a second dimension, and in a third dimension. The extension of the planar unit in the first dimension and in the second dimension is significantly greater than in the third dimension. The central axis of each
(Continued)

coil stands at least locally at least nearly perpendicular to the surface spanned by the first dimension and the second dimension. The coils are also arranged in a regular manner within the planar unit in rows and/or columns such that each coil has at least two or three immediately adjacent coils. The distances between geometric centers of area of the coils and the shape and the extension of the at least one turn per coil are selected such that the mutual electromagnetic coupling between coils is minimal for all pairs of immediately adjacent coils in the planar unit.

4 Claims, 12 Drawing Sheets

(51) Int. Cl.
- *H02J 50/40* (2016.01)
- *H02J 7/02* (2016.01)
- *H04B 5/00* (2006.01)
- *H02J 7/00* (2006.01)
- *H02J 50/70* (2016.01)

(52) U.S. Cl.
CPC ............ *H02J 50/40* (2016.02); *H04B 5/0037* (2013.01); *H04B 5/0081* (2013.01); *H02J 50/70* (2016.02)

(58) Field of Classification Search
USPC .......................................................... 307/104
See application file for complete search history.

(56) References Cited

U.S. PATENT DOCUMENTS

| | | | | |
|---|---|---|---|---|
| 7,521,890 | B2* | 4/2009 | Lee | H02J 5/005 320/108 |
| 7,633,263 | B2 | 12/2009 | Toya | |
| 7,893,568 | B2 | 2/2011 | Huang | |
| 8,810,071 | B2* | 8/2014 | Sauerlaender | H02J 5/005 307/104 |
| 2003/0210106 | A1* | 11/2003 | Cheng | H01F 3/02 333/24 R |
| 2004/0124840 | A1* | 7/2004 | Reykowski | G01R 33/3415 324/318 |
| 2005/0189910 | A1* | 9/2005 | Hui | H01F 17/0006 320/108 |
| 2007/0182367 | A1* | 8/2007 | Partovi | H01F 5/003 320/108 |
| 2008/0067874 | A1* | 3/2008 | Tseng | A61C 17/224 307/104 |
| 2008/0116847 | A1 | 5/2008 | Loke et al. | |
| 2008/0224656 | A1* | 9/2008 | Schulz | H01F 38/14 320/108 |
| 2008/0278112 | A1 | 11/2008 | Hui et al. | |
| 2009/0303746 | A1 | 12/2009 | Wang et al. | |
| 2010/0314946 | A1* | 12/2010 | Budde | H02J 5/005 307/104 |
| 2010/0328044 | A1 | 12/2010 | Waffenschmidt et al. | |
| 2011/0025133 | A1 | 2/2011 | Sauerlaender et al. | |
| 2011/0050382 | A1* | 3/2011 | Baarman | H01F 1/26 336/221 |
| 2011/0101788 | A1* | 5/2011 | Sun | H02J 5/005 307/104 |
| 2013/0038281 | A1* | 2/2013 | Sakakibara | B60L 5/005 320/108 |
| 2013/0119773 | A1* | 5/2013 | Davis | H02J 5/005 307/104 |

FOREIGN PATENT DOCUMENTS

| | | | |
|---|---|---|---|
| JP | H11032452 | A | 2/1999 |
| JP | 2009164293 | A | 7/2009 |
| JP | 2009271846 | * | 11/2009 |
| WO | 2007031897 | A1 | 3/2007 |
| WO | 2008032746 | A1 | 3/2008 |

OTHER PUBLICATIONS

"Chinese Office Action", issued in related CN application No. 2012-80021649.0 dated Nov. 3, 2015.
"Related JP Patent Application No. 2014-508798", "Office Action", dated Dec. 4, 2014, Publisher: JPO, Published in: JP.
"Related International Patent Application No. PCT/EP2012/058103 English Translation of the International Search Report", dated Nov. 14, 2013, Publisher: PCT, Published in: EP.
"Chinese Office Action", dated Feb. 3, 2017, issued in related Chinese Patent Application No. 201280021649.0, 15 pp., English Translation.
"Notification of Transmittal of Translation of the IPRP and the Written Opinion", International Patent Application No. PCT/EP2012/058103, dated Nov. 5, 2013, 10 pp.
"European Office Action", Related European Patent Application 12 721 220.7, dated May 4, 2017, 13 pp.

* cited by examiner

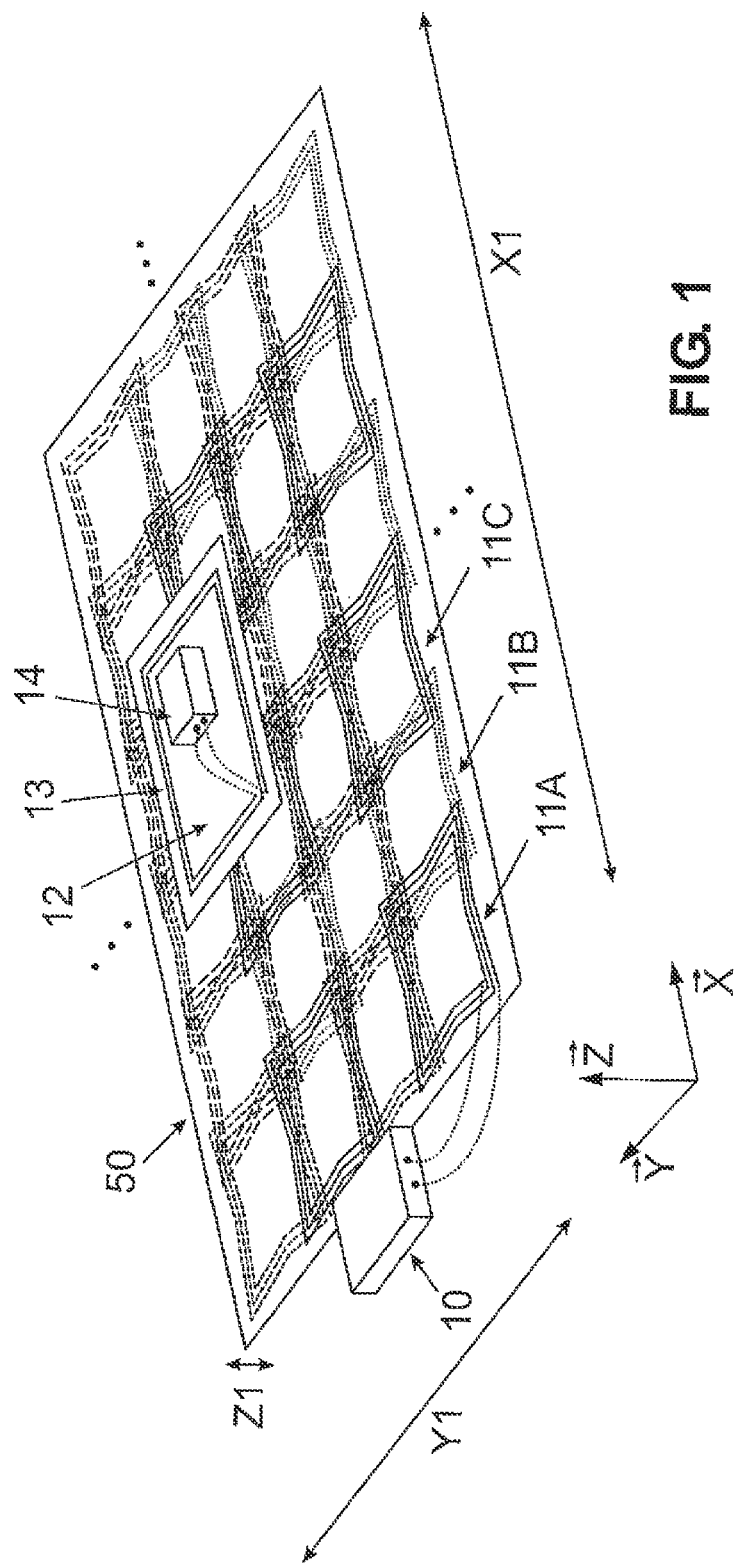

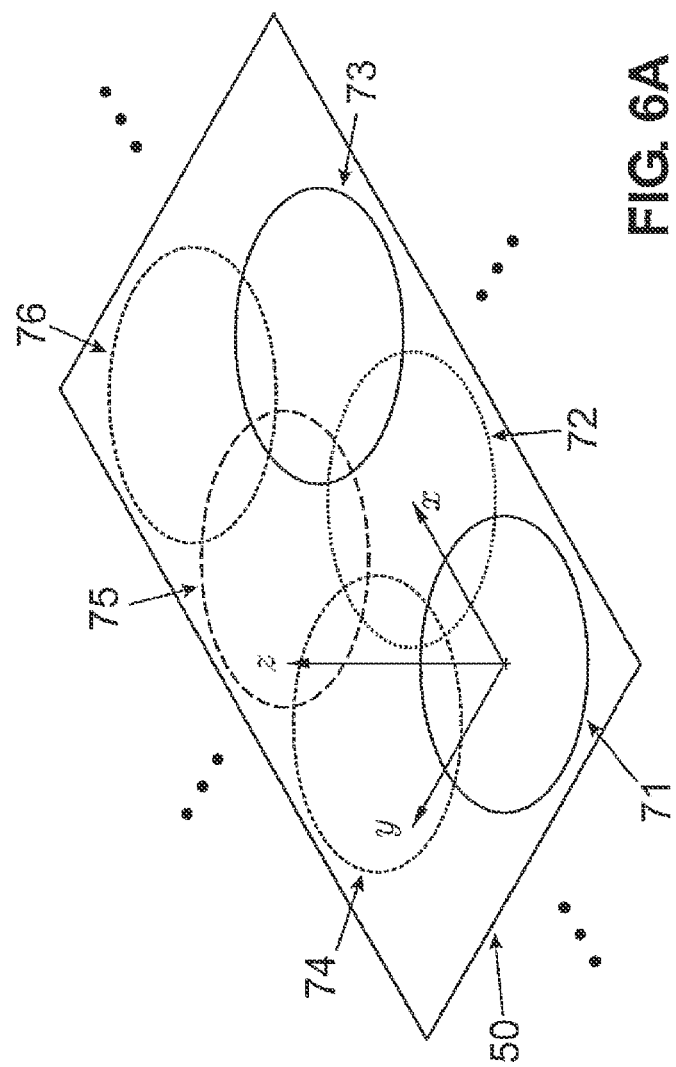

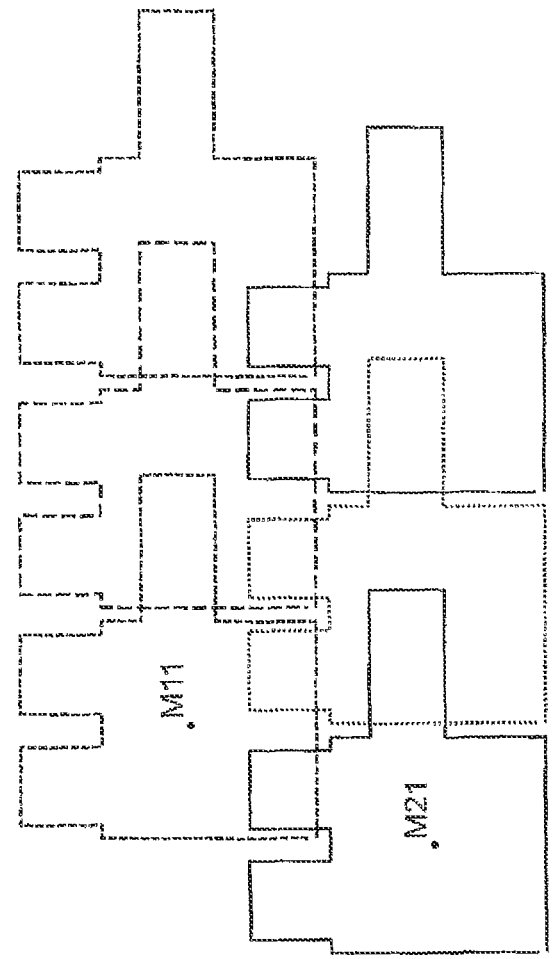
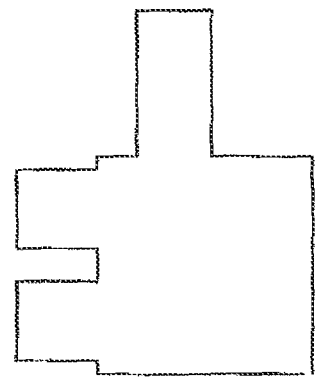
FIG. 7E
FIG. 7F

ARRANGEMENT AND METHOD FOR CONTACTLESS ENERGY TRANSMISSION WITH A COUPLING-MINIMIZED MATRIX OF PLANAR TRANSMISSION COILS

FIELD OF THE INVENTION

The invention relates to an arrangement and a method for inductive energy transmission with a coupling-minimized matrix of planar transmitter coils.

BACKGROUND

Contactless energy transmission systems based on induction are known in general. The principle is to use one or a plurality of transmitter or primary coils (also known as coils, conductor loops, turns, antennas, or current conductors) to generate voltage in one or a plurality of relatively closely positioned receiver or secondary coils by means of a temporally changeable current flux based on the principle of induction. The temporally changeable voltage induced in this manner in the receiver coil may then for instance be rectified and used to supply an electronic circuit with power and/or to charge a battery. There are numerous applications for this in consumer electronics, wherein mobile devices such as for instance laptops and smartphones are equipped with at least one integrated receiver coil and are to be arranged on a surface equipped with one or a plurality of transmitter coils, such as for instance a table surface, to be supplied energy inductively via the latter. This is then how for instance the accumulators or batteries of the mobile device are charged. Additional applications that employ the principle of induction are for instance radio frequency identification systems (RFID).

In some applications of contactless energy transmission it is advantageous when the transmitter coils or a plurality of transmitter coils are integrated in a planar unit. For instance, thinly wound, printed, or etched coils on or in a multilayer substrate, such as for instance a printed circuit board (PCB), may be used. Such a planar unit may then be integrated in an extremely varied manner into everyday items, such as for instance walls, floors, drawers, tables, etc.

The physically adjacent coils, one or a plurality of transmitter coils and the receiver coil, form a transformer-like coupling. However, compared to conventional transformers, it does not have any core or at least does not have a closed core. Thus it is generally possible to generate differently shaped magnetic field distributions and therefore consequently also to use various magnetic field components for induction. With respect to the planar unit, the horizontal field components (parallel to the surface of the planar unit) or the vertical field components (parallel to the normal vector of the planar unit), relative to the planar unit, are used for the energy transmission. Such systems are known for instance from US 2008/0116847, US 2003/0210106, and U.S. Pat. No. 7,633,263. In addition, it is possible to use suitable wiring of a plurality of receiver coils to exploit both field components (horizontal and vertical). US 2009/0303746 describes this, for instance.

In the case of vertical field components, in one type of application, two identical conductor loops (transmitter and receiver coil) that are arranged parallel and coaxially are used for transmitting the power at a small distance (very much smaller than the dimensions of the conductor loops) with high coupling. In this context, essentially the coupling factor k, which identifies the ratio of counter-inductivity M to the square root of the product of both self-inductances, is used as the coupling for two coils (characterized by the two self-inductivities L1 and L2). It is expressed as:

$$k = M/\sqrt{L1 \cdot L2}$$

Due to the fact that other physical effects, such as for instance capacitive coupling between tracks, must be taken into account that are not adequately described by the above self-inductivity and counter-inductivity, the term "coupling" in the context of this application indicates the electromagnetic coupling between two coils taking into account all physically relevant effects. The coupling is thus a measure for the quality of the transmission path and ranges from 0 (coils not coupled) to 1 (maximum coil coupling). By definition, the coupling between two coils is a symmetrical variable, which means that the coupling from the first coil to the second coil is identical to the coupling from the second coil to the first coil. In this context, the term counter-coupling is also used synonymously with coupling or mutual coupling.

When two identical conductor loops are used as the primary and secondary coils, the coupling is highly dependent on the relative position of the two coils. Thus for instance the original high coupling is no longer maintained if the distance between the two coils is increased or if one of the two coils is displaced laterally. In many applications, however, it is desirable to provide a relatively position-independent coupling and thus consequently position-independent functionality.

In accordance with the prior art, the object of generating the most homogeneous possible field on a larger planar surface and thus achieving the most homogenous possible coupling is attained for instance in that a different size is selected for the transmitter coil than for the receiver coil. Although this initially reduces the maximum achievable coupling, if cleverly designed with a spiral-shaped transmitter coil, as described for instance in US 2008/0278112, it permits a larger horizontal area with a relatively homogeneous coupling. This also permits a relatively simple system design. As an alternative to this, periodic parallel or series antenna structures, as are described for instance in US 2005/0189910 and U.S. Pat. No. 7,164,255, have proven useful. In these documents, many small transmitter coils are interconnected on one or a plurality of layers of the planar unit to create a virtual large transmitter coil such that a magnetic field that is as homogeneous as possible is created and thus the coupling (via the planar unit) with any receiver coil that is present is also homogeneous.

One drawback of these arrangements is that undesirably large electromagnetic stray fields may be created in the near vicinity of the large or virtually large transmitter coil, even if there is no receiver there. This is disadvantageous both for reasons of electromagnetic compatibility (EMC) and electromagnetic environment compatibility (EMEC), especially because of safety aspects relating to interaction with human tissue and potential health hazards.

The problems associated with undesired electromagnetic stray fields may be circumvented if the size of the transmitter coils is small compared to the size of the receiver coils. It is possible to minimize the electromagnetic stray fields as much a possible if only those transmitter coils that are physically disposed in the immediate vicinity of a receiver coil are activated, and if the coils are surrounded by materials that shield, such as for instance ferrites.

Such approaches and solutions are known from US 2007/0182367, U.S. Pat. No. 7,262,700, U.S. Pat. No. 7,521,890, US 2009/023719 A1, US 2010/0314946, US 2010/0328044, US 2011/0025133, and U.S. Pat. No. 7,893,568. These disclose fields (arrays) of switchable transmitter coils on a planar unit, which fields may be individually switched. In these documents, in addition to the relative positioning and arrangement of the fields of coils, the issue of adequate activation and control of the individual coils also plays a major role. However, this aspect is not the subject-matter of the present invention.

The advantage of this technique is that a plurality of receiver coils may be supplied in a relatively simple manner because only the most closely positioned transmitter coil is turned on and supplied with power. Moreover, the aforesaid solution may be scaled in size in a relatively simple manner in that the planar unit is for instance enlarged by adding additional transmitter coils. The critical disadvantage of these solutions, however, is that a suitable switching device must be provided for each transmitter coil, which increases the complexity of the arrangement and the electronics associated with it and therefore increases costs.

BRIEF SUMMARY OF THE INVENTION

It is an object of the invention to provide a device that makes it possible to transmit energy uniformly and inductively to one or a plurality of receivers, the position of a receiver relative to the transmitter having the least possible effect, within certain limits, on the efficiency of the transmission of the energy.

It is also an object of the invention to optimize the efficiency of the inductive transmission of energy on the transmission side as well, in particular by optimizing the coils geometrically.

In accordance with a first aspect of the invention, an arrangement or a device is provided for contactless energy transmission by means of induction. The arrangement or apparatus includes a plurality of coils. The coils may be arranged in a matrix. The coils have at least one conductor that surrounds a central axis of the coil at least once in one turn. Naturally there may also be a plurality of turns per coil, which turns may be for instance helical and/or spiral in shape. In the context of the present invention, the central axis is an axis that runs through the center of the coil about which the turn or turns of the coil wind. The central axis may then stand vertically on the surface surrounded by the conductor in the form of the turn. The central axis may stand in the center or the geometric center of area of the surrounded surface. The geometric center of area here defines a center point of the geometric shape of the turn or turn of the coils. This geometric shape plays a major in the context of this description. Depending on the embodiment of the turns in the coils, the center point may then coincide with the center of area and be used synonymously. In complex coil shapes, it is no longer possible to define a simple center point, such as for instance in a circle. Therefore the geometric center of area is also used here. Simplified, the center of the coil is found, and, depending on the coil geometry, it may itself be identical or essentially identical to the center point or the geometric center of area. It is assumed that these points are within the turns and are disposed in the center of the coil, when the latter is viewed along its central axis. The coils may then be arranged adjacent to one another in a flat layer. In this context this is also called a planar unit. The flat layer or planar unit may, but does not have to be, a geometric plane. The flat layer, plane, or planar unit extends in a first direction, in a second dimension, and in a third dimension. The extension of the planar unit in the first dimension (length, X direction) and in the second dimension (width, Y direction) is then significantly greater than in the third dimension (thickness, Z direction). The central axis of each coil then stands at least locally at least nearly perpendicular to the surface spanned by the first dimension and the second dimension (X-Y plane). In other words, the central axes of the coils essentially lie in the direction of the third dimension, that is, in the Z direction, if X, Y, and Z are the abscissa of a Cartesian coordinate system.

The coils may then also be arranged in a regular manner within the flat layer in rows and/or columns such that each coil has at least two or three immediately adjacent coils. The extension of the coils in the third dimension is thereby much smaller than in the first and second dimensions. These are planar transmitter coils. In a top view along the central axis of the coils, the coils then are preferably arranged in a matrix in rows and columns. There are at least three transmitter coils. In one advantageous embodiment, there may be at least two columns and/or two rows. In accordance with advantageous embodiments, there may be at least three or four coils, it also being possible in principle to have at least two or three coils arranged adjacent to one another in a line (center point on a straight line). In one arrangement with four coils, the immediately adjacent coils may then be the three other coils. If four coils are on one line (1 dimensional arrangement), a coil has a maximum of two immediately adjacent coils.

The distances between the centers or geometric centers of area for the coils and the shape and the extension of the at least one turn per coil are then selected such that the mutual coupling between coils is minimal for all pairs of immediately adjacent coils in the flat layer.

This property distinguishes the present invention from all known arrangements. Normally, in such flat arrangements (for instance flat substrate in the form of a printed circuit board, pad, or table, etc.), attention is paid to the homogeneity of the generated field. Other solutions attempt to achieve the transmission of energy and the essentially position independence of the energy receiver in that the transmitter coils are turned on and off according to the position of the receiver. The present invention may be interpreted as an expansion of these switchable transmitter coils to the extent that the individual transmitter coils may be operated simultaneously using the mutually minimized coupling both individually and combinably as desired in order to thus provide the required field distribution for efficient energy transmission to one or a plurality of receiver coils. At the same time the limited field distribution may be provided for the physical region of the receiver. In solutions in accordance with the prior art, two simultaneously operated immediately adjacent transmitter coils could interfere due to mutual coupling such that in some circumstances the consequence could be reduced system functionality. The present invention prevents this. However, the mutual coupling of the transmitter coils must then be taken into account. In accordance with the invention, the couplings of the immediately adjacent coils are optimized (minimized), since in general they are the greatest due to the physical proximity. There are various solutions for this, and they shall be explained using the following aspects of the invention and using the exemplary embodiments.

In real coil arrangements, the pair-wise counter-coupling between a plurality of coils arranged adjacent to one another in a planar manner cannot be completely prevented. Moreover, the couplings of pairs of coils that are not immediately adjacent to one another cannot be entirely prevented. Therefore in accordance with the present invention all possible couplings of all coils are minimized. It has been shown that for exemplary embodiments a minimum or optimum may be found at 5% (taking into account all other detectable influences, k is equal to or less than 0.05 for all pairs of coils in the matrix). In accordance with the invention the coupling may be reduced to about 1% (taking into account all other detectable influences, k is equal to or less than 0.01). The couplings of pairs of coils that are not immediately adjacent are also taken into account.

The given maximum coupling value then is advantageously the maximum of all possible pair-wise couplings. For a regular arrangement of for instance 6 coils, this leads to a matrix that may be as follows:

$$k = \begin{matrix} K11 & K12 & K13 & K14 & K15 & K16 \\ K21 & K22 & K23 & K24 & K25 & K26 \\ K31 & K32 & K33 & K34 & K35 & K36 \\ K41 & K42 & K43 & K44 & K45 & K46 \\ K51 & K52 & K53 & K54 & K55 & K56 \\ K61 & K62 & K63 & K64 & K65 & K66 \end{matrix}$$

The maximum may be at one or a plurality of positions. For instance, K$62$ may equal 1.34%. The limit for the coupling may be for instance 5%, 2%, or 1%. For a limit of 5% or 2%, the arrangement of coils that are described by the matrix above would then attain the inventive minimizing of the coupling. K$62$ would also have to represent the maximum coupling value of the matrix (by amount). All other entries in the matrix are then smaller than (or equal to) the amount for K$62$. The matrix may be symmetrical, wherein the main diagonal entries may then go to zero since with this definition of coupling a coil cannot be coupled with itself, that is, this property is already included in the self-inductivity. In another definition, the values of the main diagonal entries may also be one if for these elements the counter-inductivity is replaced by the self-inductivity in the definition of the coupling factor. The entries in the main diagonals are not important for the following, however, and may therefore be zero or one, as desired.

In accordance with one aspect of the invention, the majority of coils may have an essentially identical shape. This simplifies the design and optimization of the coil arrangement.

The centers or geometric centers of area for the coils may be arranged such that in the first dimension they are on a first straight line by row. Then the coils would be arranged adjacent to one another in a planar manner such that their centers of area (or centers or center points) are all on a straight line. The first dimension may be for instance the length of the flat layer or the planar unit in which the coils lie.

The geometric centers of area or the center points of the coils may furthermore be arranged such that they are on a second straight line by column in the second dimension. Overall a regular matrix of adjacently arranged coils is achieved in this manner. This makes it easier to optimize the coil arrangement.

For each row of the matrix there is a first straight line on which are disposed the centers of area or centers or center points of the coils. For each column there is a second straight line on which are disposed the centers of area or center points of the coils.

The (first) straight lines of the rows may then be parallel to one another and the (second) straight lines of the columns may also be parallel to one another.

The centers of area or center points of the coils may preferably be arranged in a grid. The grid may advantageously be regular.

In accordance with a first preferred embodiment, the first straight lines (of the rows) and the second straight lines (of the columns) may intersect at right angles so that the coils are arranged in a regular, checkerboard pattern.

In accordance with a second preferred arrangement, the first straight lines and the second straight lines may intersect at angles not equal to 90°. The coils of the matrix may then be arranged in a honeycomb-type structure.

In another preferred arrangement, the turns of immediately adjacent pairs of coils may overlap in pairs. This leads to the coils being arranged over one another for instance at one point or in one area such that the turns of four coils simultaneously form one slice plane. This is another preferred measure for optimizing the counter-inductivity of the coils.

In another embodiment of the arrangement, the winding direction for at least one coil may be changed by segment. In this case, the turn of the coil is conducted such that it runs counter to the original winding direction of the coil at least for one segment and then returns to the original winding direction (there is thus a small partial coil with the reverse winding direction, the surface of which within the part of the turn that has the reversed winding direction is smaller than the surface of the entire coil). This measure also permits the coupling to be optimized. In this arrangement it is then possible where necessary for the turns of adjacent coils not to overlap and for the turns not to be nipped inward.

In accordance with a few exemplary embodiments of the invention, the surfaces spanned by the at least one turn of each coil for each immediately adjacent pair of coils overlap in pairs. In a checkerboard-type arrangement of the coil field, for instance, this also leads to the surfaces enclosed by the coils forming a slice plane. When there are four coils this occurs once in the center of the arrangement.

Furthermore the coils in the matrix may be arranged periodically within each row and each column, with the same distance interval by pair. This measure also facilitates optimization of the arrangement.

If the coils are arranged in a checkerboard-type pattern, then the turns of the coils may advantageously, at least by segment, locally approach the center and/or the geometric center of area of the coil. In this case it is assumed that the turn of the coil passes through the perimeter of a geometric shape that is for instance rectangular, triangular, polygonal, round, or rounded. If it is a square, then the turns do not run precisely on the linear connections of the corner points but rather approach the center between successive corner points, at least by segment, more strongly than dictated by the linear connection between the corner points. This may occur in the form of rectangular inward nipping or in the form of segments inclined towards the center of the coil.

In accordance with one aspect of the invention, each coil is embodied such that its at least one turn has, at at least a first, second, third, and/or fourth point, a maximum distance to the geometric center of area or center of the coil and wherein the first, second, third, and/or fourth points are pair-wise adjacent points along the perimeter of the coil that is defined by the at least one turn.

The at least one turn of each coil then approaches the center of area or center of the coil between the first and second points and the second and third points, at least by segment. This facilitates minimizing the interacting counter-inductivities of the coils. What is critical is that this approach towards the center or center of area of the coil occurs on least at two adjacent sides of the geometric shape.

The first, second, third, and fourth points may be the corners of a rectangle. In other exemplary embodiments, they may be the corners or corner points of a square.

The arrangement in a honeycomb-type structure of the coils may be attained in that the centers of surface or centers of each coil in each row opposing the centers of surface or centers of the coils of an adjacent row are offset in the first and/or second dimension. This results in the honeycomb-type structures in which the approach of the turns of the coils to the center of area or center, at least by segment, is not absolutely necessary. The centers of are of the coils in a row may be arranged centered with respect to the centers of area of the coils is a different row.

The invention also provides a method for producing an arrangement of a plurality of coils in a flat layer or planar unit that is suitable for contactless transmission of energy by means of induction. In accordance with this method, the coils are arranged and dimensioned such that the pair-wise mutual coupling between the coils is minimized. Advantageously only the counter-inductivity of coil pairs that are immediately adjacent to one another is optimized. The counter-inductivity present for two coils that are not immediately adjacent may act as an upper limit for the optimization of the counter-inductivities of the immediately adjacent coils. For checkerboard-type structures, the coils may overlap in pairs. Likewise, the turns may be embodied such that they approach the centers of area or centers, at least by segment, instead of a straight geometric shape (for instance a rectangle or square). Additional aspects of the method result from the foregoing aspects of the invention and from the exemplary embodiments.

The invention furthermore provides a method for contactless transmission of energy. Coils are arranged or dimensioned such that the pair-wise electromagnetic coupling between all possible pairs of coils is minimized.

BRIEF DESCRIPTION OF THE DRAWINGS

Additional aspects and features of the invention may be found in the following description of the preferred exemplary embodiments of the invention, with reference to the figures, in which:

FIG. 1 is a perspective elevation of one exemplary embodiment of the invention;

FIG. 6A is a perspective elevation of another exemplary embodiment of the invention in a honeycomb-type structure;

FIGS. 7A through 7F illustrate additional exemplary embodiments for checkerboard and honeycomb-type structures; and, FIGS. 8A and 8B illustrate another exemplary embodiment of the invention.

DETAILED DESCRIPTION OF THE PREFERRED EXEMPLARY EMBODIMENTS

Figure 2A:
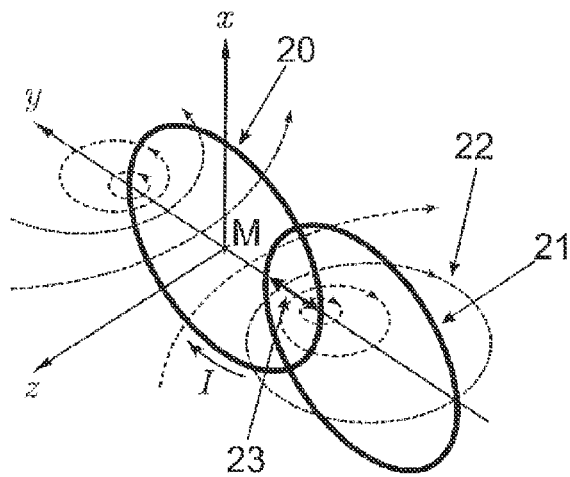
FIG. 2A through FIG. 2C illustrate how the counter-inductivity of two coils is minimized.

FIG. 1 is a perspective elevation of a first exemplary embodiment of the invention. It depicts an inventive coupling-minimized matrix made of transmitter coils 11A, 11B, 11C, . . . for inductive energy transmission. The flat layer or planar transmitter unit 50 is formed by a planar transmitter unit that comprises the transmitter coils 11A, 11B, 11C, etc. and a power supply 10 that is connected to all of the transmitter coils (illustrated only for coil 11A). The geometry of the transmitter coils is inventively optimized such that the mutual electromagnetic coupling of all transmitter coils to one another is minimized. This enables individual layout and control of the individual transmitter coils. One receiver 12, depicted as an example, is equipped with a receiver coil 13 that is connected to a receiving unit 14. The goal of this arrangement is the optimized inductive (contactless or wireless) transmission of energy from the planar unit 50 to the receiver 12. The position of the receiver 12 on the planar unit 50 is irrelevant (largely irrelevant) for the energy coupled into the receiver or the receiver coil 13. This may be done on the one hand in that only the transmitter coil or coils positioned next to the receiver unit are activated and on the other hand using the simultaneously high packing density (no region on the planar unit 50 that does not have transmitter coils) and the ability to discretely control (both individually and any desired common neighbors) the transmitter coils without the latter having a mutual (negative) effect.

The planar unit 50 extends in a dimension X, in a second dimension Y, and in a third dimension Z. The extension in the first dimension (length) is X1. The extension of the planar unit 50 in the second dimension is Y1. The extension in the third dimension is Z1. The extension in the first dimension (X direction) and in the second dimension (Y direction) is markedly greater than in the third dimension (Z direction). X1, Y1>>Z1. The extension in the third dimension is largely determined by the number of turns in the coil, the pair-wise overlapping of the coils, and possibly other material-specific variables that may also be dictated by the material that encloses the coils. In particular the arrangement of the coils on a printed circuit board (PCB) may be considered.

The inventive arrangement takes into account the coupling factors between every two transmitter coils. In general, with each temporally changing current flux in any transmitter coil an electrical voltage is induced in all of the other transmitter coils. This may be a drawback if a plurality of adjacent transmitter coils are involved in the energy transmission, since they mutually couple with one another and consequently can interfere with one another. This disadvantage is eliminated or minimized in accordance with the invention. The inventive arrangement is especially useful when the packing density of the transmitter coils is high. The geometry optimized transmitter coils have a minimum mutual coupling of all transmitter coils with one another. In this way the transmitter coils in the matrix may be switched as desired separately or even together without having significant mutual influence.

Figure 2B:
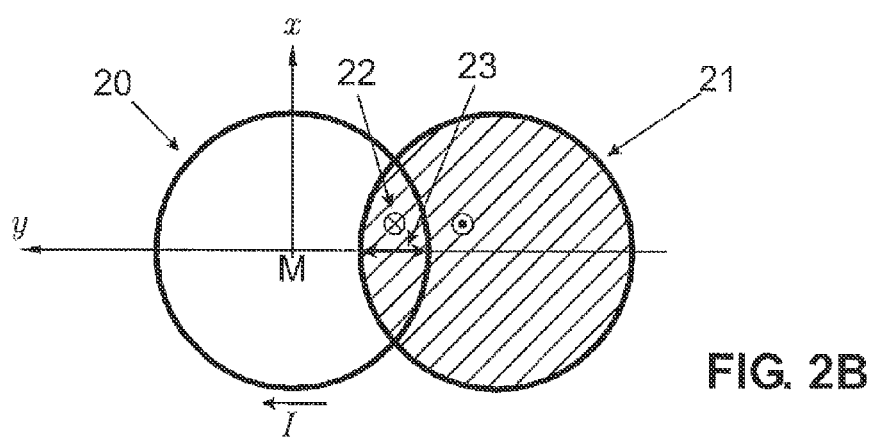
Figure 2C:
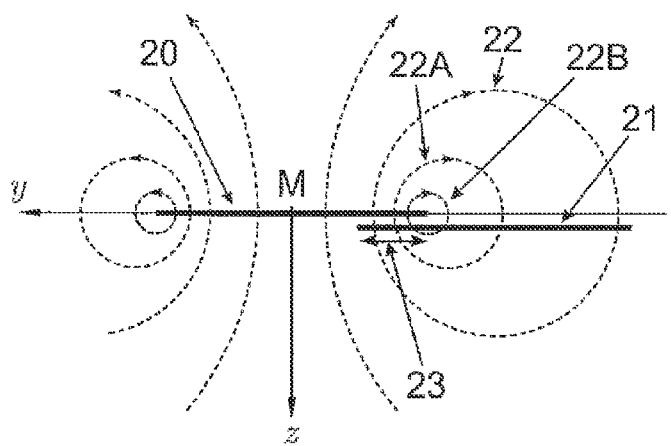

The relationship between overlapping of coils and coupling of coils shall be described for two round coils in the following using FIGS. 2A through 2C. The figures illustrate two circular conductor loops or coils 20 21 that are significantly decoupled from one another and that are shown from different perspectives. The two conductor loops 20 and 21 are arranged laterally offset from one another so that they overlap by the length 23. Current I flows through the conductor loop 20. Some of the resulting magnetic field lines of the coil 20 are drawn in with broken lines 22. Using the field lines or the shape of the field lines 22, one skilled in the art can detect the type of directionality of the magnetic field lines depending on whether the field lines are disposed in the center M of or outside of the coil 20. One possibility for describing the coupling of the two coils is to define the counter-inductivity of both coils, which may be expressed via the flux of the field lines across the surface encircled by the coil 21 (surface area with cross-hatching in FIG. 2B). Given a certain displacement 23 of both coils relative to one another, the field lines 22, 22A, and 22B, some of which directionally oppose one another, superimpose themselves on one another over the surface of the coil 21 such that the total flux and thus the coupling moves significantly towards 0. The special displacement at which the two coils are substantially electromagnetically decoupled depends on many parameters, such as for instance material properties, coil size and shape, layer distance, etc. and may be determined for instance using measurements or simulation. In FIG. 2C it is also possible to see that the two coils are arranged offset to one another and electrically separated from one another. This may be attained for instance in that they may be applied to different layers of a printed circuit board.

Figure 3:
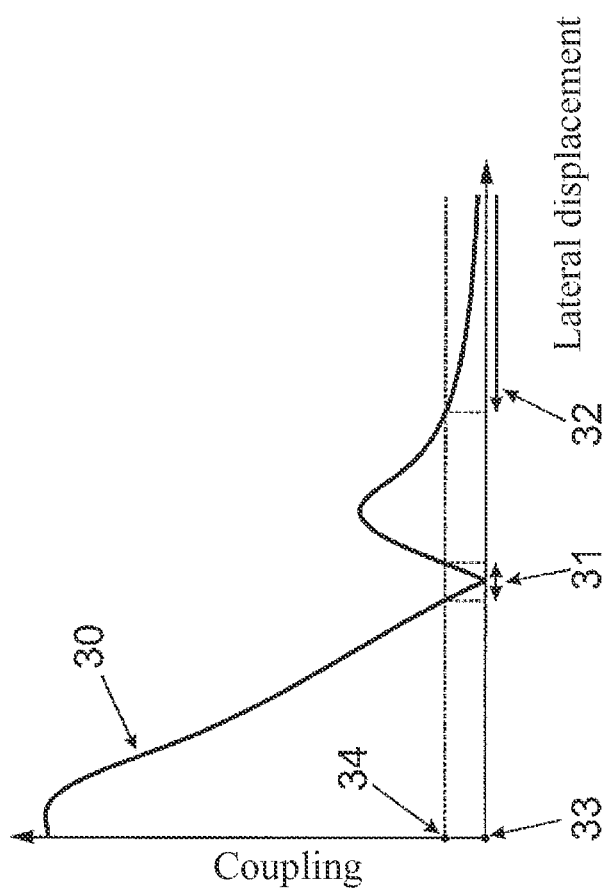
FIG. 3 is a simplified graph in which the amount of the counter-coupling is shown as a function of the lateral displacement of the coils illustrated in FIGS. 2A through 2C.

FIG. 3 is a graph in which the amount of the counter-coupling is depicted relative to the lateral displacement. FIG. 3 illustrates a possible course of the electromagnetic coupling of two variably laterally displaced parallel coils, as is depicted for instance in FIGS. 2A through 2C using partial overlapping of the coils. The coordinate origin 33 represents a coupling of 0 on the ordinate and a centering of the two coils on the abscissa. While the precise curve 30 is a factor of various parameters such as for instance the size and shape of the two coils and even the materials used, two essential properties are characteristic. First, at a certain lateral displacement 31 the coupling experiences a change in algebraic sign. In addition, the coupling grows increasingly smaller as distances become greater (large lateral displacements). The person skilled in the art is easily persuaded of the change in algebraic sign for the coupling in that the definition of counter-inductivity (essential for the coupling) is based on the surface integral of the magnetic flux. At a certain displacement 31, the opposing flux portions compensate for one another, as is illustrated in FIGS. 2A through 2C. It is therefore possible to essentially attain decoupling of the two coils using this technique. In the context of the present invention this means that the coupling drops below a certain minimum limit or a critical value 34. This happens when the lateral displacement is either in the range 31 or in the range 32. In accordance with the present invention these two ranges are exploited advantageously for different coil configurations and coil geometries.

Thus, in accordance with the invention a plurality of coils on a planar unit or flat layer are designed, dimensioned, and arranged such that all of the coils or any desired pair of coils possesses a minimum mutual coupling. In particular, this pair-wise coupling k is below a critical value, which may be less than or equal to 5%, less than or equal to 2%, or less than or equal to 1%. Thus a temporally changing current flux in any transmitter coil does not cause any significant induced voltages in all of the other transmitter coils. By minimizing the coupling by pairs, all of the coils are simultaneously substantially decoupled from one another. Possible applications are for instance in RFID systems or in inductive energy transmission systems generally. The arrangement may advantageously be used for charging mobile devices. In other applications, the aspects of the invention may be advantageously employed for switchable transmitter coils in inductive energy transmission systems.

Figure 4A:
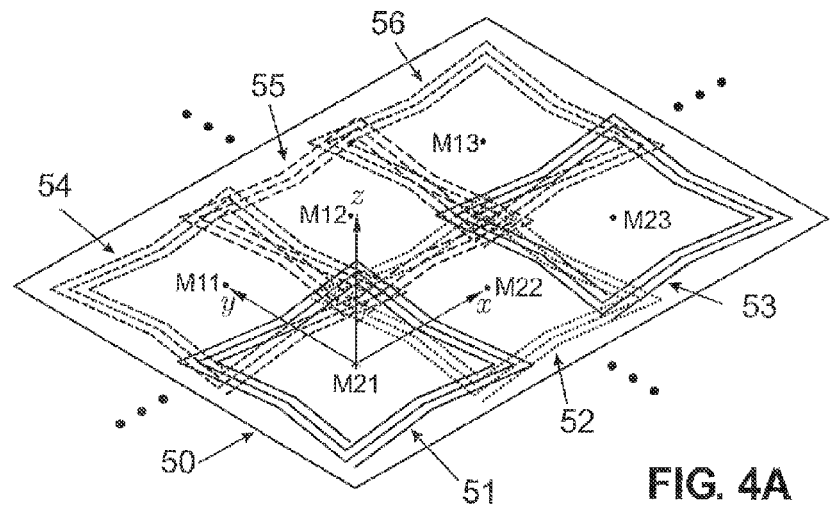
FIGS. 4A through 4C provide three views of the exemplary embodiment of the invention shown in FIG. 1.
Figure 4B:
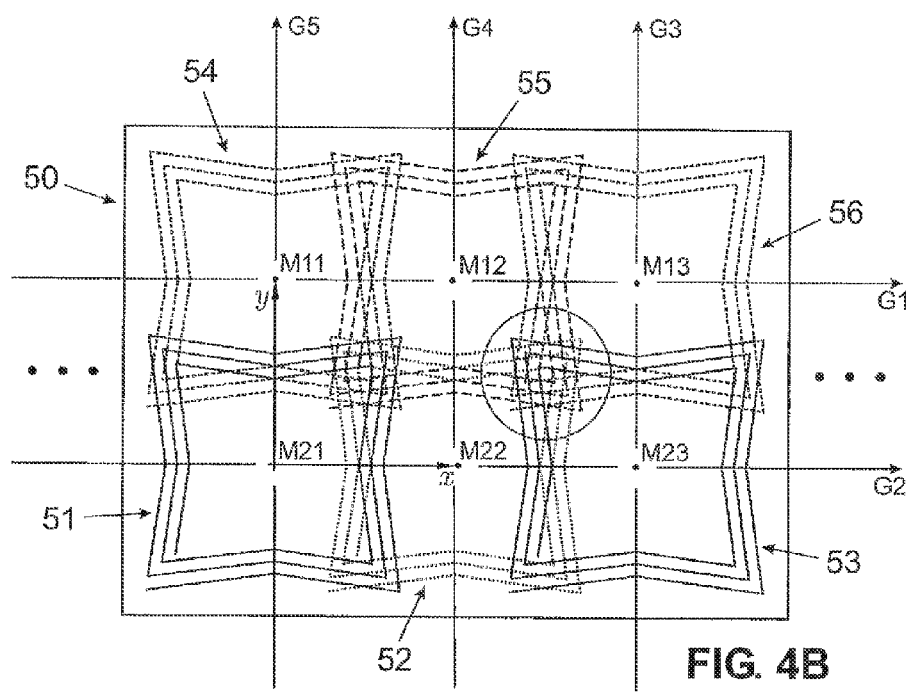
Figure 4C:
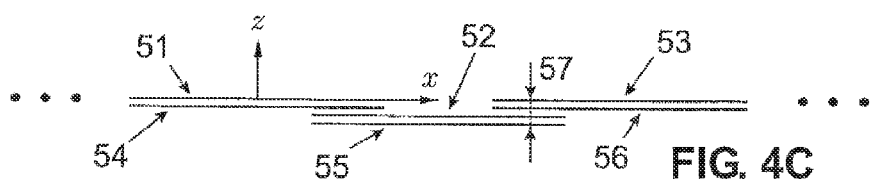

FIGS. 4A through 4C are depictions of an exemplary embodiment of the invention. In this exemplary embodiment, the planar unit 50 has six coils 51, 52, 53, 54, 55, and 56, that are arranged in a checkerboard manner. In accordance with the invention, the coils are decoupled by pairs and thus are overall significantly decoupled. The coils are for instance spiral in shape and have three turns. Any two immediately adjacent transmitter coils, for example the coils 51 and 52, are arranged on different layers of the planar unit. The planar unit must therefore have at least a thickness 57. In the X direction and in the Y direction the coils are arranged overlapping such that there is substantial electromagnetic decoupling according to the aspects of the invention. Likewise, any two diagonally adjacent coils, for example the coils 51 and 55, are arranged with a partial overlap. This likewise attains pair-wise decoupling of diagonally (also immediately) adjacent coils. So that the substantial decoupling may be provided both for two immediately adjacent coils and also for two diagonally adjacent coils, the coils are not embodied in a simple rectangular shape. What this achieves is that not only laterally adjacent coils, but also diagonally adjacent coils with respect to the pair-wise overlapping surfaces (slice plane of the area of a pair of coils that is enclosed by the turns of the coil) are designed such that a substantial decoupling of each coil pair results. In contrast to a simple rectangular shape, the corners of the coils are more pronounced, and the side edges nip inward, so that the individual coils have a slight star shape. The coupling between two coils that are not immediately adjacent, for instance the coils 51 and 53, are already physically so far away from one another that with no further measures the coupling is already below the critical limit in region 32 of FIG. 3. FIG. 4C provides the front elevation, illustrating how the partially overlapping coils may be arranged for instance in four different layers of the planar unit. All adjacent coils overlap in the circularly enclosed region in FIG. 4B.

As an example the center points M11 through M23 for the coils 51 through 56 are also shown. The center points M11 through M23 may be the centers of area of the area enclosed by the turns of the coils. It is not necessary to proceed from a very stringent mathematical geometry. On the contrary, the issue is to define a center point for the simplified description of the arrangement of the coils. The checkerboard arrangement is then characterized in that the thus defined center points M11 through M23 of the coils are in rows and columns of a regular matrix. Alternatively, this may also be described in that the center points M11, M12, and M13 are on one straight line G1 and the center points M21, M22, and M23 are on another straight line G2, the straight lines G1, and G2 being parallel. Likewise, the center points M11 and M21 are on a straight line G5, the center points M22, M12 are on a straight line G4, and the center points M23 and M13 are on a straight line G3. The straight lines G3, G4, and G5 are also parallel to one another. The straight lines G3, G4, and G5 may then be called straight lines for the columns or may even be called the columns of the matrix, while the straight lines G1 and G2 form the rows of the matrix.

The information for the exemplary embodiment in FIGS. 4A through 4C is as follows:

There are three turns for each coil. The distance between the center points of the coils in the x and y directions is 30 mm. The side length a of the outer turn for each coil (square) is 42.84 mm (optimized). The inward nip towards the center point is characterized by the angle α=7.57° (optimized) (the side length a and the angle α are shown in FIG. 5B). The thickness (extension in the Z direction) of the planar unit (57 in FIG. 4C) is 1.5 mm. Additional values that are not immediately relevant are the width of the tracks, which is 1 mm, and the distance between two tracks, which is also 1 mm.

The overlap then results from the distance between the center points and the size of the square, as calculated for instance as (42.84 mm−30 mm)/42.84 mm=30%.

The given maximum coupling value is the maximum of all possible pair-wise couplings. In the exemplary embodiment in FIG. 4, the individual couplings of all 6 coils are for instance:

$$k = \begin{pmatrix} 0 & 0.0101 & -0.0093 & -0.0130 & -0.0133 & -0.0064 \\ 0.0101 & 0 & 0.0101 & -0.0129 & -0.0130 & -0.0134 \\ -0.0093 & 0.0101 & 0 & -0.0070 & -0.0129 & -0.0130 \\ -0.0130 & -0.0129 & 0.0070 & 0 & 0.0117 & -0.0093 \\ -0.0133 & -0.0130 & -0.0129 & 0.0117 & 0 & 0.0117 \\ -0.0064 & -0.0134 & -0.0130 & -0.0093 & 0.0117 & 0 \end{pmatrix}$$

It may be seen that the absolute maximum between coils 2 and 6 (row 2, column 6) is 0.0134=1.34% (the matrix is symmetrical, the main diagonal entries here are zero, since a coil in this definition of coupling does not couple with itself, and this is already taken into account in the self-inductivity). The coils 2 and 6 in the example from FIG. 4 are the coils 52 and 56, that is, two diagonally adjacent coils.

The data for the exemplary embodiment in FIGS. 4A through 4C are selected within typical measures and materials. For integrating the planar unit into everyday objects such as tables, walls, floors, cradles, etc., it is advantageous to select the extensions of the individual transmitter coils with side lengths or diameters of a few millimeters to a few meters. There are theoretically no lower limits (as coil size decreases), but the complexity increases as the coils become smaller, especially in terms of production and in terms of control electronics, since more coils are required for the same overall dimensions of the planar unit. There is an upper physical limit (as coil size increases), since given a fixed frequency the extension of a coil that becomes increasingly large at some point will reach the order of magnitude of the wavelength and the coil then no longer functions as a coil (natural resonance, capacitive influences, radiation, etc.) For frequencies in the low MHz range, this upper limit may be for instance a few meters to several meters. A reasonable number of turns for the transmitter coils likewise depends on many factors and typically decreases as frequency increases. With respect to track strengths and wire diameters, values from the micrometer range to the millimeter range are preferred, larger track cross-sections generally having a positive effect on coil quality and efficiency due to lower Ohmic losses. However, frequency-dependent effects, such as skin or proximity effects, may influence the optimum selection of the track cross-section.

Figure 5A:
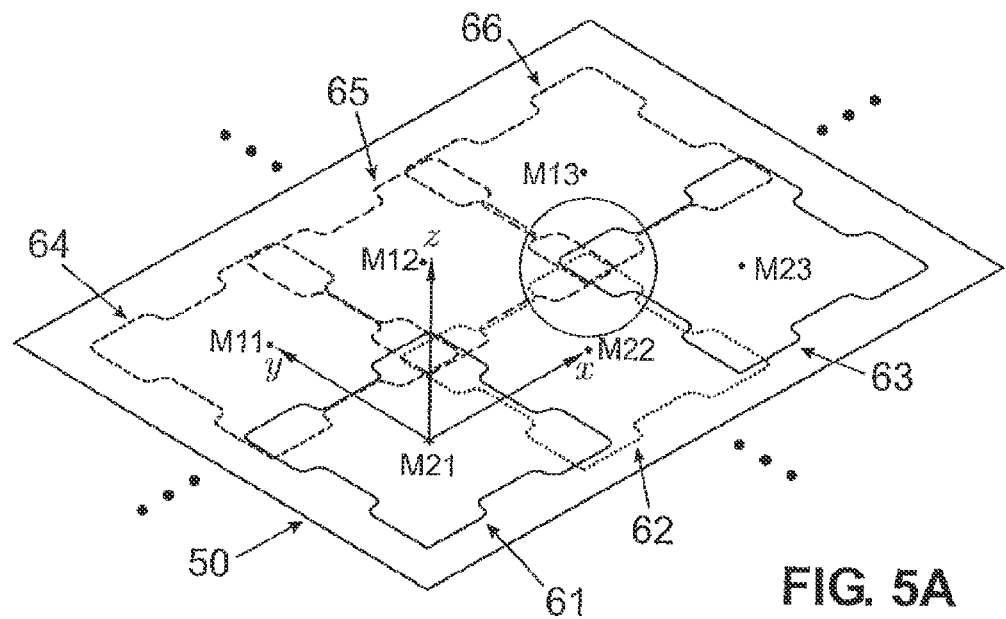
FIGS. 5A through 5E illustrate additional exemplary embodiments of the invention
Figure 5B:
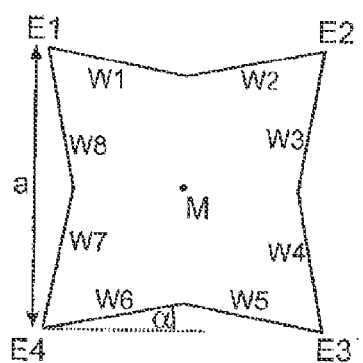
Figure 5C:
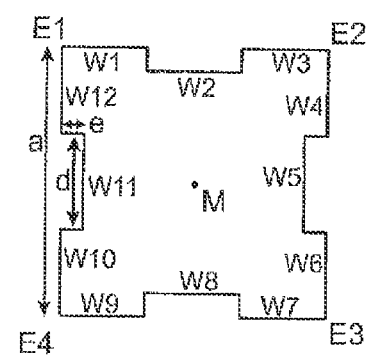
Figure 5D:
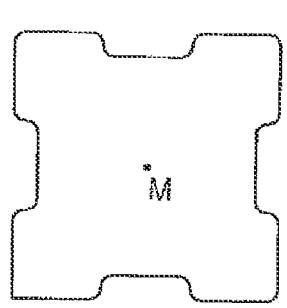
Figure 5E:
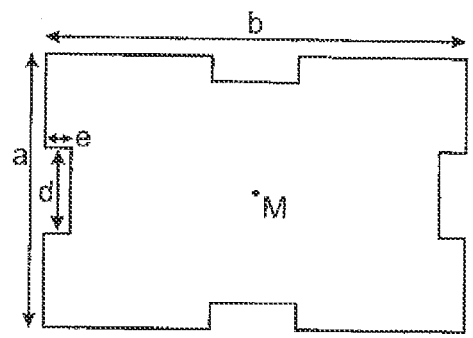

FIGS. 5A through 5E depict additional exemplary embodiments of the invention. Again the planar unit 50 or the flat layer is shown with a plurality of decoupled transmitter coils. Compared to FIG. 4A, in FIG. 5A a different basic coil shape has been used that also permits all couplings to be achieved below a critical value so that all coils may be considered substantially decoupled from one another. In FIG. 5a, the shape of the coil surface area at the four corners that is needed for the decoupling is not attained using a star-shaped extension as in FIG. 4A, but on the contrary is realized using a rectangular reduction in the surface area on the four lateral edges. The basic shape of the individual coils, for instance 61, shall be understood to be only schematic. Spiral and/or helical coils having a plurality of turns may also be used on different layers. FIG. 5B, FIG. 5C, FIG. 5D, and FIG. 5E also illustrate the different basic structures. In addition to the star-shaped structure in FIG. 5B, which is also used in FIG. 4A, and the rectangular variant 5C depicted in FIG. 5A, coil geometries that include for instance rounded corners as illustrated in FIG. 5D may also be used. This rounding is also possible for the star-shaped structure in FIG. 5B. It is also possible to lay out the basic structure asymmetrically in the two physical directions of the planar unit (X and Y), as is illustrated in FIG. 5E, for instance.

In this embodiment, as well, the coils 61 through 66 are disposed in the planar unit 50 and are essentially arranged in the X-Y plane. The extension in the Z direction is dictated by the overlapping and additional factors such as number of turns, materials, etc.

The coil shape illustrated in FIG. 5B, which may be described as somewhat star-shaped, may be characterized by two parameters. These are the side length a and the angle of inclination $\alpha$. Optimizing these two variables and arranging the coils appropriately in the planar surface area permits the counter-coupling between pairs of coils that are arranged immediately adjacent to one another (and immediately diagonally adjacent) to be optimized in a simple manner. What is critical is that there is a deviation from the square shape, which deviation in this case is characterized by the angle $\alpha$ (inclination of the turn towards the center M of the coil), and specifically more pronounced than the straight-line connection between the corner points E1, E2, and E2, E3 or E3, E4 and E4, E1. The coil has segments W1 through W8. The segments W1 and W2 connect the adjacent corner points E1 and E2. The corner points E1 through E4 lie on the corner points of a square. The segments W1 and W2 deviate from a straight connection of the two corner points E1 and E2 in that they move towards the center M of the arrangement at an angle $\alpha$. This is how an inward nip in the coil is attained on all four sides.

FIG. 5C depicts another exemplary embodiment of the invention. The corner points E1 through E4 of this geometric coil embodiment are also on the corner points of a square. In this case the inventive inward nip is attained using a rectangular course towards the center M of the coil. For instance, between the corner points E4 and E1 the coil initially runs in a straight line on the segment W10. Then the turn turns at a right angle towards the center M for a length e. The turn then again runs in a straight line for a length d in segment W11, then turns away from the center M a right angle towards the segment W12 for a length e, and finally runs in a straight line in segment W12 to the corner point E1. It is possible to optimize this coil geometry in that the parameters a, d, and e are changed until a minimum counter-coupling is attained between all immediately adjacent coils (also between diagonally adjacent coils).

Likewise, the coil geometry that is depicted in FIG. 5E may be optimized. In this case it must be taken into account that the corner points of this coil shape are on the corner points of a rectangle. This rectangle has the side lengths a and b. The inward nip is again characterized by its length d and its depth e. In this case a, b, d, and e would have to be optimized. For simplification, in this case the ratio R=a/b may be defined and then a, d, and e may be optimized. Thus only three parameters would need to be optimized in this case, as well. In the case of FIG. 5B, the parameters a and $\alpha$ (that is, two parameters) and in the case of FIG. 5C, the parameters a, d, and e (that is, three parameters), must be optimized. In addition the position of the coils relative to one another must also be taken into account, of course.

FIG. 6A depicts another exemplary embodiment of the invention. This time the coils are arranged in a honeycomb-type pattern. When the coils are arranged in a honeycomb-type pattern within the planar unit 50, the star-shaped or rectangular inward nips described in the foregoing in accordance with FIGS. 5B and 5C are not needed. In this case, coils that are immediately adjacent (for instance 71 and 72), that is, the coils within a row or the coils within a column of the matrix, are substantially decoupled from one another. However, some of the diagonally adjacent coils cannot be decoupled. The at most eight adjacent coils for a selected coil in the matrix structure (immediately and diagonally) are offset by the non-rectangular arrangement of the rows and columns in the honeycomb structure such that two of the diagonally adjacent coils are farther apart from one another and thus no longer may be or must be decoupled using partial overlapping. This applies for instance to coils 71 and 75. In accordance with one exemplary embodiment of the invention, partially overlapping rectangular coils, polygonal coils, or even round coils may be used. The illustrated arrangement is already advantageous compared to coil arrangements that work entirely without significant decoupling of adjacent coils. It is a drawback, however, that there is no complete decoupling, as is possible in accordance with the exemplary embodiments in FIGS. 4A and 5A, since the diagonally positioned coils in the checkerboard-type system (for instance coils 71 and 75) may have a mutually negative effect due to residual coupling that is present. However, compared to the checkerboard-type arrangement, with the honeycomb-type arrangement it may be considered advantageous that, when optimizing the coil geometry for the mutual substantial decoupling, only the geometric size (that is, one parameter) of the basic structure, for example the radius if the shape is a circle, has to be taken into account if the grid of the center points of the coils is defined.

Figure 6B:
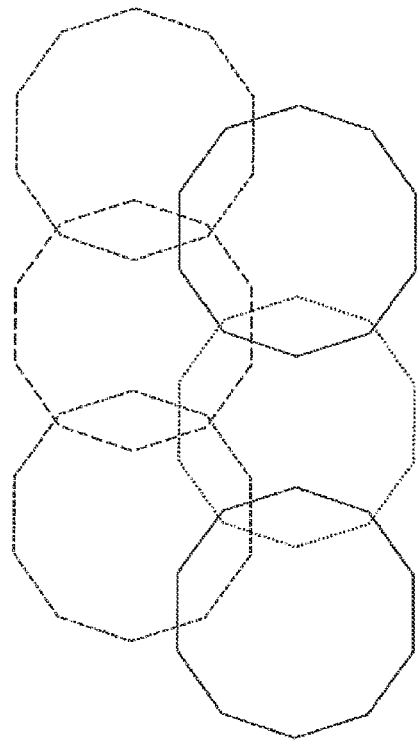
FIGS. 6B through 6K illustrate additional exemplary embodiments of honeycomb-type structures.
Figure 6D:
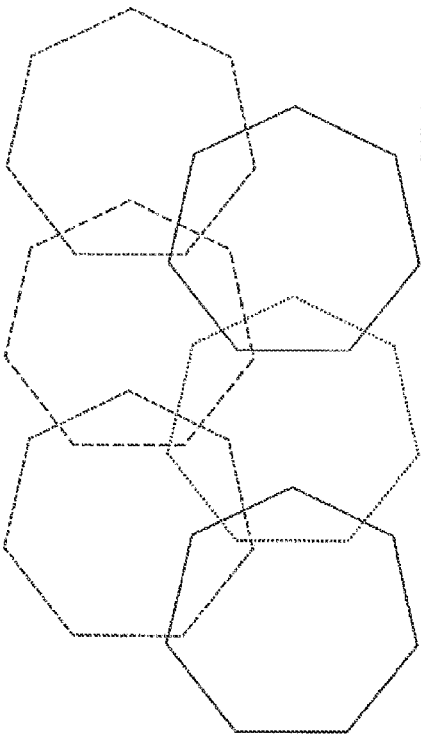
Figure 6C:
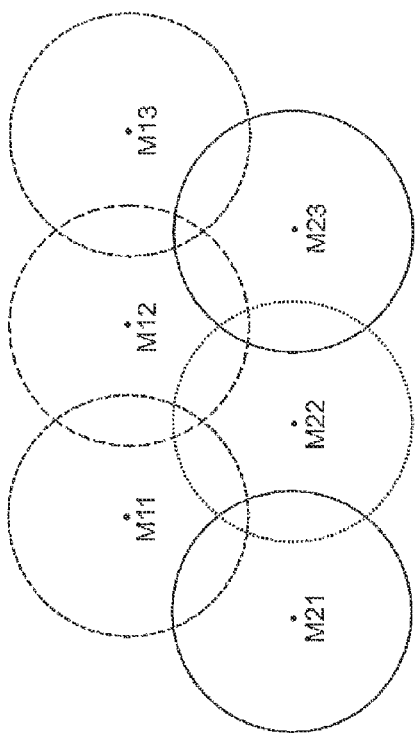
Figure 6E:
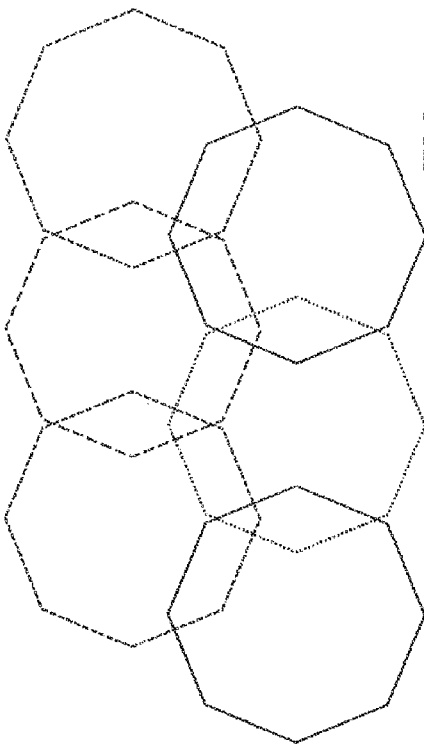
Figure 6F:
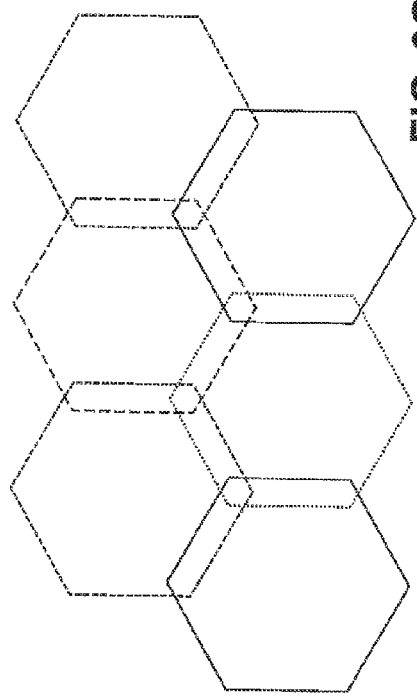
Figure 6G:
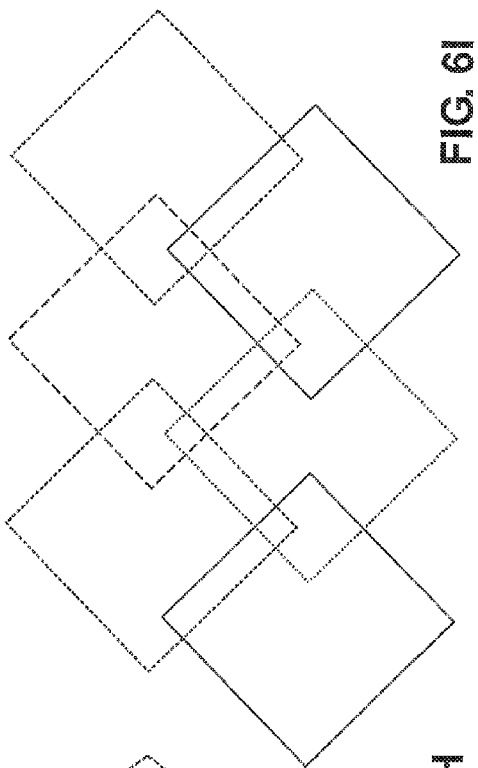
Figure 6H:
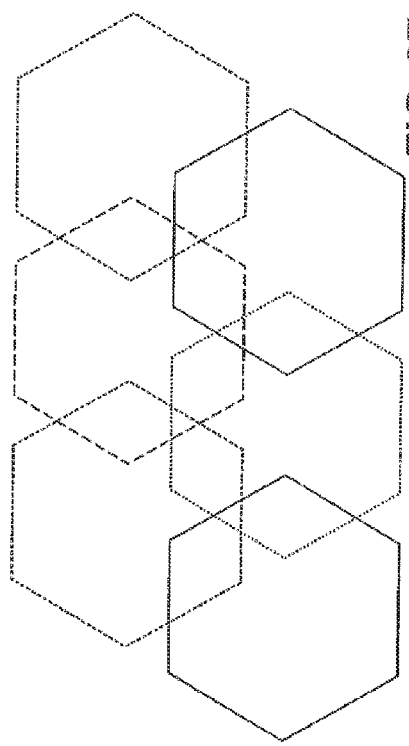
Figure 6I:
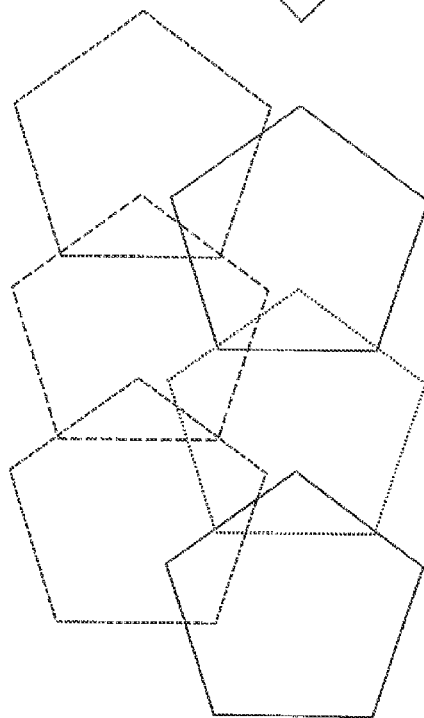
Figure 6J:
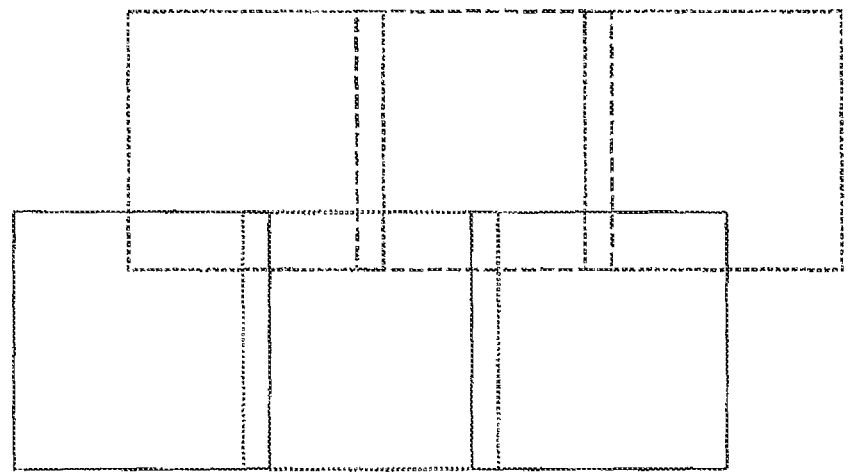
Figure 6K:
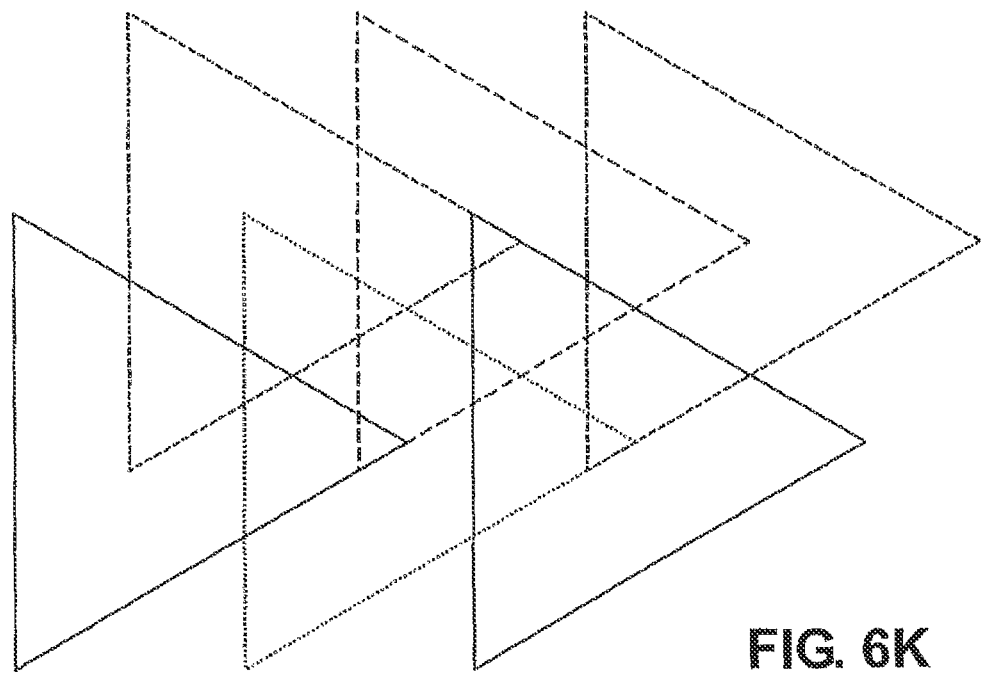
Figure 7A:
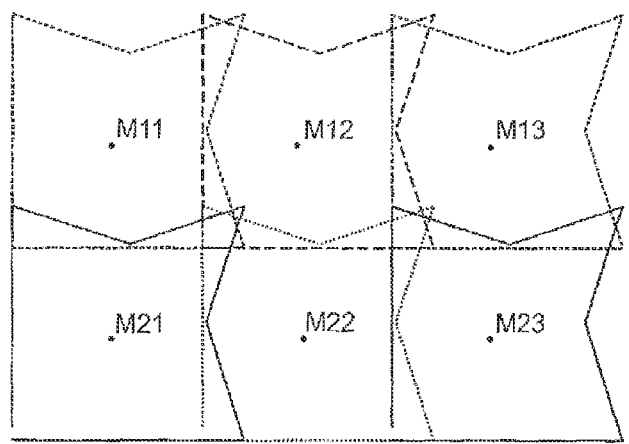
Figure 7B:
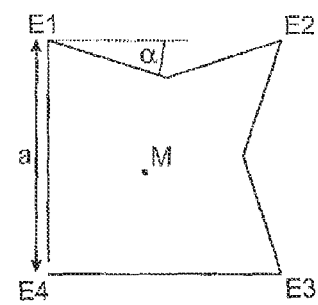
Figure 7C:
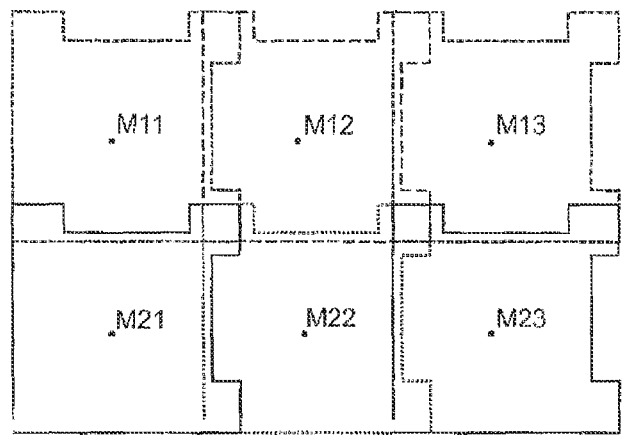
Figure 7D:
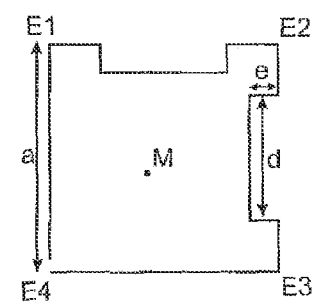

FIGS. 6B through 6K depict additional embodiments for honeycomb-type structures. FIG. 6B illustrates a honeycomb-type structure having circular coils. FIGS. 6C through 6H are polygons having ten corners, eight corners, seven corners, six corners, and five corners. FIG. 6I depicts an exemplary embodiment having rectangles just like in FIG. 6J. The rectangles in accordance with FIGS. 6I and 6J may also be rotated about their center points. In all of these cases, at least the immediately adjacent coils overlap. FIG. 6K is an example with triangular coils.

In the exemplary embodiment depicted in FIG. 6A, two rows with coils 71, 72, 73 (first row) and 74, 75, 76 (second row) are each arranged offset to one another by half the distance between the coil center points. The partial overlap of each set of two adjacent coils (for example 71 and 72 or 71 and 74) is selected specifically such that the two coils may be considered as substantially decoupled from one another. The coils that are not immediately adjacent, for example 71 and 73 or 71 and 76 (and as a special case also 71 and 75) are already so far apart from one another that a critical coupling is not attained and these two coils may also be considered as substantially decoupled from one another. FIG. 6B is a top view of the coils 71 through 76. As is depicted in the other FIGS. 6C through 6K, such substantially decoupled coils in a honeycomb-type structure may also be attained using regular polygons, especially triangles, rectangles, pentagons, hexagons, heptagons, octagons, nonagons, and decagons. It is not necessary to ensure a certain angle of rotation of the basic structure about the center point. In other words, the substantial decoupling for instance of the squares in FIG. 6I may even be attained when the squares are arranged at a different angle of rotation, as depicted for example in FIG. 6J. This is shown in FIGS. 6F and 6G for hexagons, as well. For different angles of rotation, however, in certain circumstances the size of the individual polygons may change (in the optimization process). In all of the shapes suggested in FIGS. 6B through 6K, spiral, multi-layer, or even wound coils, especially in the case of circular coils, may also be used. In addition, basic structures with asymmetries in both physical directions of the planar unit may be provided (for instance an ellipse instead of the circle from FIG. 6B or asymmetrical changes to the polygons).

FIGS. 7A through 7F depict additional exemplary embodiments of the invention. FIGS. 7A through 7F depict exemplary embodiments of the invention in which the basic shape of the transmitter coil is asymmetrical. Thus for example the pattern from FIG. 7A with the associated basic coil from FIG. 7B may be considered a modification to the star-shaped pattern from FIG. 4. In addition, however, in accordance with the invention all of the coils are arranged substantially decoupled from one another due to the optimized partial overlapping. Consequently the pattern in FIG. 7C with the associated basic coil in FIG. 7D may considered a modification of the rectangular pattern from FIG. 5A, wherein furthermore all coils may be considered substantially decoupled from one another due to the optimized partial overlapping. The pattern in FIG. 7E with the associated basic coil from FIG. 7F also permits substantial decoupling of all coils due to the intentional partial overlapping. This pattern is an asymmetrical modification of the honeycomb structure from FIG. 6J, wherein this structure may be produced with a two-layer substrate. In the exemplary embodiment in FIG. 7A, the center points of the coils M11 through M23 are arranged in a checkerboard-type pattern. The same is true for the exemplary embodiment in FIG. 7C. The exemplary embodiment in FIG. 7E is again a honeycomb structure.

Figure 8B:
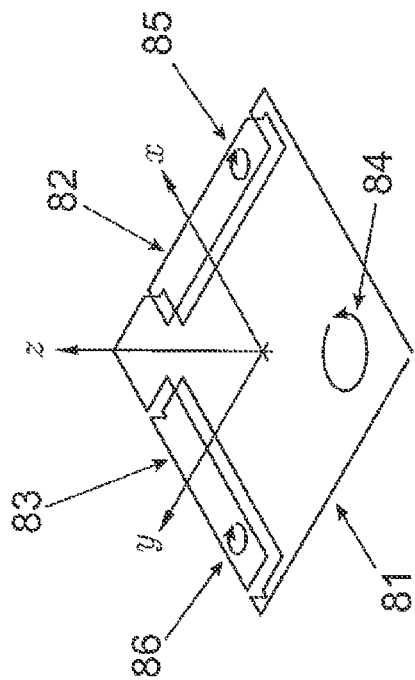
Figure 8A:
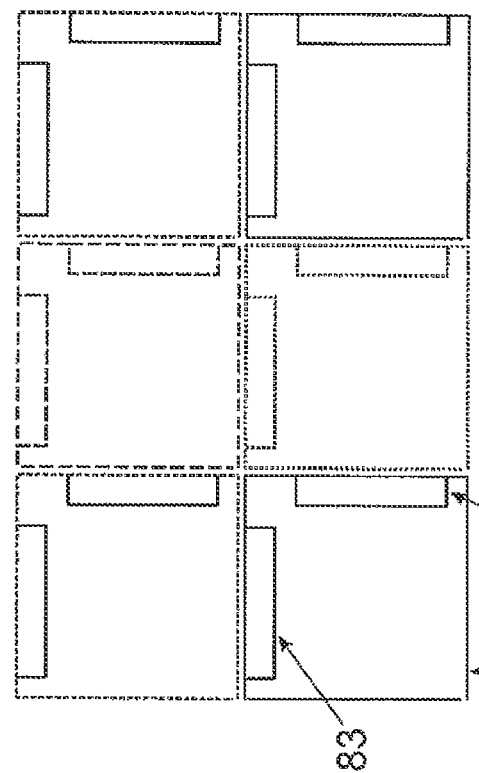

FIGS. 8A and 8B depict another exemplary embodiment of the invention. In this case, the substantial decoupling of all transmitter coils is not attained using partial overlapping of the adjacent coils, but rather in that the winding direction of the individual basic coils changes across the basic coil surface using the coil 81, as is shown in FIGS. 8A and 8B. This is for instance attained in that for example two areas 82 and 83 of the coil 81 having opposing winding directions are added. Due to the intentional change in the winding direction within the basic coil (see winding direction 84 of the basic coil with the winding direction 85 and 86 of the areas 82 and 83), the direction of the resulting magnetic field lines also changes. The counter-inductivity and thus the coupling of two (immediately and if necessary diagonally) adjacent coils may be significantly minimized if the geometry design is optimum. This may also satisfy the goal of significantly reducing the coupling of all transmitter coils. In this exemplary embodiment it must also be noted that in some circumstances the coupling of the individual transmitter coils to one or a plurality of potentially available receiver coils may be reduced due to the change in the winding direction and thus the overall system behavior may experience worsen. In contrast, it may be easier to produce the coil arrangement because of this, since under some circumstances fewer layers of the planar unit have to be used.

One of the crucial advantages of the invention is that temporally changing current flux in any transmitter coil has only a minor effect on an adjacent coil in the coil matrix.

This is especially an advantage for those systems in which a plurality of transmitter antennas are controlled individually, that is, also simultaneously, and thus have a current flux. In general the invention enables a high relative packing density for the transmitter coils. This makes it possible to avoid areas within the planar unit or flat layer in which there are no coils, thus potentially making it impossible to supply a receiver coil at these locations. Furthermore it should be considered an advantage that any desired scalability of the inventive arrangement is possible. The planar unit may thus also theoretically be expanded in both physical directions (X and Y). Theoretically this makes it possible to supply any number of receivers. Moreover, in accordance with the present invention it is possible to use different receiving antenna shapes as long as these are matched to the transmitter coils. Overall there are two major types of application. First, there is the case of small transmitter antennas and larger receiver antennas, and second, there is the case of large transmitter antennas and smaller receiver antennas.

In this context the term antenna is used synonymously with the term coil. For the special case that only one individual transmitter coil is ever controlled, the invention does not have much of an advantage, since induced voltage in a deactivated or separated adjacent coil does not draw any current flux or draws only very little currently flux. But the situation is quite a bit different if at least two adjacent transmitter coils are operated simultaneously. Due to the mutual influence of coupled transmitter antennas, the effective self-inductivity of the individual antenna or coil changes via the counter-inductivity, and the consequence of this for instance may be that a resonant circuit is detuned and there is thus also reduced efficiency. In accordance with the aspects of the present invention, the individual transmitter antennas may be combined as desired and with phase synchronized control may be shaped to create virtually effective antennas in any shape. Given the example of a large number of small transmitter coils, above which a larger receiver antenna is placed, the transferred power may be optimally adjusted by turning on different transmitter antennas. If for instance the induced voltage in a receiver coil using a single activated transmitter coil is not adequate for supplying the receiver with enough power, a second adjacent transmitter coil may be added in. This increases the induced voltage and thus also the transmitted power. Partial overlaps of two adjacent coils also involve the advantage that the two coils have the greatest magnetic fields in the area of the overlap if both coils are activated. However, this area is typically positioned below the receiver coil and should therefore not be considered critical and may even be considered advantageous due to the reduction in the stray field.

If a plurality of large transmitter antennas are operated physically adjacent to one another independent of one another in the planar unit, that is, there is no phase-synchronized control, using the suggested method of substantial decoupling it may be assured that the two antennas do not mutually influence one another or mutually influence one another only to a very minor extent. If this were not the case, that is, if both coils were operated in the conventional manner physically adjacent to one another, the two coils would mutually couple with one another and, in the worst case, the resulting currents could destructively overlay one another. This is not the case with the inventive arrangement or the inventive method. On the contrary, due to the intentional partial overlapping, the entire area above the transmitter coils may be covered.

The inventive flat layer or planar unit may for instance be inserted into tables or affixed thereto for supplying mobile devices such as for instance smartphones, laptops, monitors, lamps, and much more with electrical power. This may include for instance charging batteries. In addition to tables, the planar unit may also be integrated into floors or carpets of rooms, for instance. In this case as well, mobile devices such as for instance vacuum cleaners or floor lamps may be supplied power in a contactless manner. Planar units may even be integrated into floors of garages or outside of buildings, for instance in public spaces, for instance for charging the batteries of electrically powered cars. Smaller planar units may also be integrated for instance into charging cradles or drawers for supplying smaller mobile devices, such as for instance mobile telephones, with current. It is also possible to integrate the planar unit in walls for supplying for instance digital picture frames, lamps, televisions, and much more with power.

Another application of the invention may lie in the area of RFID. In this exemplary embodiment the planar unit or flat layer may be used as a multifunctional RFID transmitter antenna, wherein the magnetic fields may be shaped differently by the specially adjusted phases of the alternating individual transmitter currents. This may be used for instance to reliably read out RFID labels whose physical orientation is not a priori fixed.

What is claimed is:

1. An arrangement for contactless energy transmission by means of induction, including:
    a plurality of coils arranged in a matrix,
    each coil having at least one conductor that has a shape and an extension and surrounds a central axis of the coil at least once in one turn,
    the central axis of the coil forming a coil center,
    the coils being arranged adjacent to one another with distances between the coil centers and in a regular manner in a planar unit that extends in a first dimension, in a second dimension, and in a third dimension,
    the planar unit having an extension in the first dimension and in the second dimension that are significantly greater than in the third dimension,
    the coils being arranged in a regular manner within the planar unit in rows and/or columns such that each coil has at least two immediately adjacent coils,
    the distances between the coil centers and the shape and the extension of the conductor with at least one turn per coil being selected such that the electromagnetic coupling between coils is minimal for all pairs of immediately adjacent coils in the planar unit,
    the coils being arranged in a regular manner in a checkerboard-type pattern and surfaces spanned by the at least one turn of each coil overlapping in segments for each immediately adjacent pair of coils, wherein the immediately adjacent coils comprise diagonally adjacent coils.

2. The arrangement in accordance with claim 1, a maximum pair-wise coupling of all coils within the matrix falling below a limit value, wherein the limit value may in particular be 5%.

3. The arrangement in accordance with claim 1, wherein if the coils are arranged in a checkerboard-type pattern and have corner points, the turns of the conductor in each coil, at least by segment, locally approach the core center between corner points.

4. The arrangement in accordance with claim 1, wherein winding direction of at least one coil changes by segment.

* * * * *